(12) United States Patent
Basford

(10) Patent No.: US 11,982,094 B2
(45) Date of Patent: May 14, 2024

(54) TRAILER VISOR METHOD AND DEVICES

(71) Applicant: Jeffrey Basford, Poway, CA (US)

(72) Inventor: Jeffrey Basford, Poway, CA (US)

( * ) Notice: Subject to any disclaimer, the term of this patent is extended or adjusted under 35 U.S.C. 154(b) by 389 days.

(21) Appl. No.: 17/503,286

(22) Filed: Oct. 16, 2021

(65) Prior Publication Data

US 2023/0119936 A1    Apr. 20, 2023

(51) Int. Cl.
  *E04H 15/08*  (2006.01)
  *B60P 3/32*  (2006.01)
  *H04W 4/80*  (2018.01)

(52) U.S. Cl.
  CPC ............... *E04H 15/08* (2013.01); *B60P 3/32* (2013.01); *H04W 4/80* (2018.02)

(58) Field of Classification Search
  CPC .............................. E04H 15/06; E04H 15/08
  USPC .................................................. 160/119, 122
  See application file for complete search history.

(56) References Cited

U.S. PATENT DOCUMENTS

| 2,423,402 | A | * | 7/1947 | Olsen | ........................ | E04H 15/08 |
| | | | | | | 160/46 |
| 3,324,869 | A | * | 6/1967 | Duda | .................. | E04F 10/0625 |
| | | | | | | 135/88.12 |
| 7,059,660 | B1 | * | 6/2006 | Juola | ....................... | E04H 15/06 |
| | | | | | | 135/88.03 |
| 7,108,005 | B1 | * | 9/2006 | Christenson | ............ | E04H 15/06 |
| | | | | | | 296/159 |
| 7,789,097 | B1 | * | 9/2010 | Sotirkys | ................... | E04H 15/06 |
| | | | | | | 135/88.01 |
| 9,393,856 | B2 | * | 7/2016 | Ogilvie | ................... | B60J 1/2011 |
| 2003/0094833 | A1 | * | 5/2003 | Thompson | ............... | E04H 15/08 |
| | | | | | | 296/173 |
| 2003/0230329 | A1 | * | 12/2003 | McGarty | .................. | E04H 15/06 |
| | | | | | | 135/88.07 |
| 2007/0113879 | A1 | * | 5/2007 | Li | ........................... | E04H 15/08 |
| | | | | | | 135/88.07 |
| 2007/0209693 | A1 | * | 9/2007 | Banfill | .................... | E04H 15/06 |
| | | | | | | 135/88.08 |
| 2015/0292232 | A1 | * | 10/2015 | Ogilvie | ................... | B60J 1/2011 |
| | | | | | | 160/48 |
| 2015/0330087 | A1 | * | 11/2015 | Taylor | .................. | E04F 10/0666 |
| | | | | | | 160/69 |
| 2019/0166427 | A1 | * | 5/2019 | Mathiasen | ............... | H04R 5/02 |
| 2019/0352925 | A1 | * | 11/2019 | Pearson | ................... | E04H 15/60 |
| 2021/0108439 | A1 | * | 4/2021 | Pearce | .................... | E04H 15/06 |
| 2021/0278758 | A1 | * | 9/2021 | Kalil | ....................... | G03B 21/10 |

(Continued)

*Primary Examiner* — Noah Chandler Hawk
(74) *Attorney, Agent, or Firm* — Edmond DeFrank

(57) ABSTRACT

The embodiments disclose a method including securing a trailer visor to a camping trailer forming a water proof and fire retardant awning for providing cover from sun and rain in proximity of a camping trailer door, connecting the trailer visor to the camping trailer using a trailer visor main body coupled PVC cord and camping trailer structure coupled PVC rail, supporting the trailer visor using a fiberglass pole coupled to the trailer visor and at least one main structure support pole coupled to the camping trailer structure using at least one pole pocket/insertion points and the trailer visor, stabilizing the trailer visor using at least one guyline coupled to the camping trailer structure and the trailer visor main body, and integrating at least one electronic component to the trailer visor for providing exterior lighting and exterior camera viewing using a digital trailer visor application installed on a user digital device.

20 Claims, 9 Drawing Sheets

(56) References Cited

U.S. PATENT DOCUMENTS

2022/0106807 A1* 4/2022 Tibbetts ................ E04H 15/644
2022/0356726 A1* 11/2022 Venter .................... H02S 30/20
2022/0396968 A1* 12/2022 Zemke ................. E04H 15/644

* cited by examiner

TRAILER VISOR METHOD AND DEVICES

BACKGROUND

Towable camping trailers generally do not include an awning to provide shade and rain protection over the doorway. Outdoor cooking can present a problem for a camping user without an awning as rain would dampen the experience. Just sitting outside in a hot summer sun can make it uncomfortable without shade protection. Removable rigid awnings are difficult to store in the camping trailer can add considerable weight to the camping trailer towing load.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview:

It should be noted that the descriptions that follow, for example, in terms of a trailer visor method and devices is described for illustrative purposes and the underlying system can apply to any number and multiple types of towable camping trailers. In one embodiment of the present invention, the trailer visor method and devices can be configured using waterproof and fire retardant polyester material for a visor shaped removable awning. The trailer visor method and devices can be configured to include one flexible fiberglass pole for structure to keep the visor shaped removable awning taut and can be configured to include adjustable awning poles and polyester cordage guylines to securely stabilize the awning using the present invention.

Figure 1:
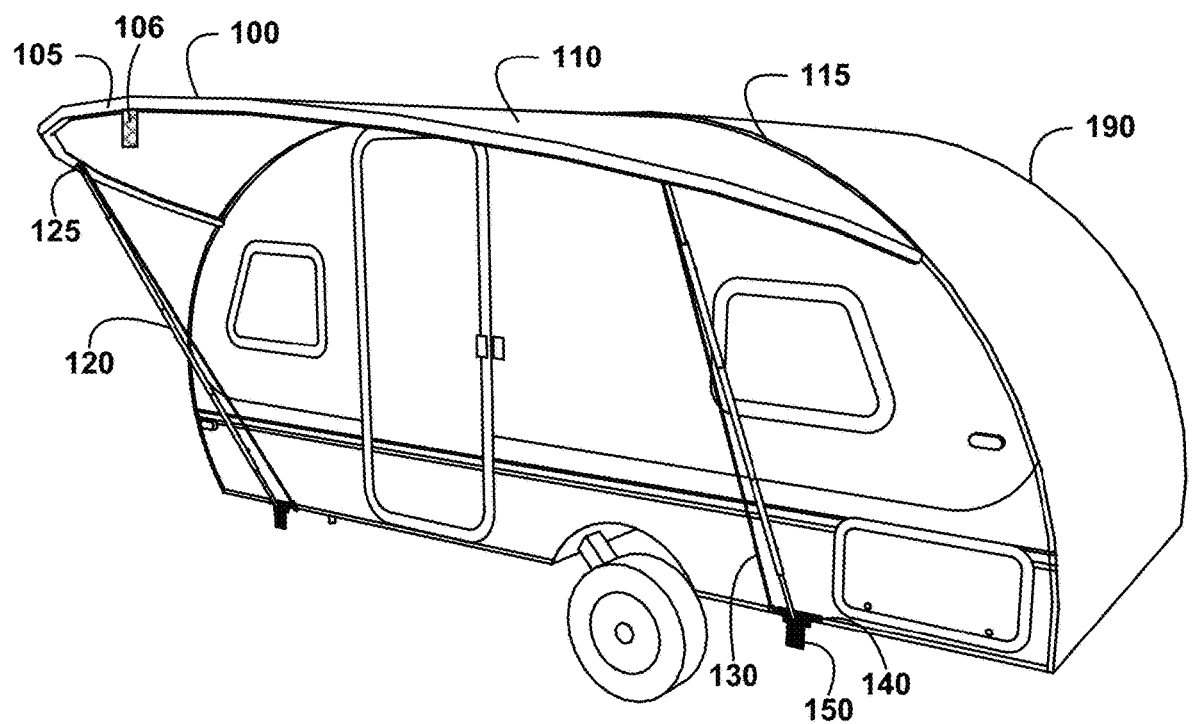
FIG. 1 shows for illustrative purposes only an example of a trailer visor method and devices of one embodiment.

FIG. 1 shows for illustrative purposes only an example of a trailer visor method and devices of one embodiment. FIG. 1 shows a trailer visor 100 coupled to a towable camping trailer. The trailer visor 100 is a removable awning to provide weather protection (sun/rain) over the doorway of a towable camping trailer 190. The trailer visor 100 solves the problem of having to egress the camping trailer directly into the rain or other inclement elements. The trailer visor 100 also helps keep the interior of the trailer cool by casting shade over the door and side window of the camping trailer. A trailer visor 100 can be coupled on both sides of the trailer simultaneously of one embodiment.

The trailer visor 100 includes a pole sleeve 105 with a fiberglass pole inserted not shown to hold the shape and tautness of the trailer visor 100 main body with an outer pole sleeve 110. The main body with an outer pole sleeve 110 includes a water proof coating and a fire-retardant coating which meets cpai-84 fire retardancy standards. A webbing strap 106 can be used in this position for a ground guyline installation. A PVC cord 115 also referred to as rope edge or awning cord, is sewn along the edge of the trailer visor 100, and is used to connect the trailer visor 100 to the trailer by inserting the PVC cord 115 into a PVC rail 140 installed on the trailer body. At least one main structure support pole 120 can vary in diameter and length depending on a trailer make and size of one embodiment.

A webbing strap 125 sewn into the outer edge of the pole sleeve 110, with grommets inserted, allows a tip of the at least one main structure support pole 120 to insert, and to which an adjustable guyline 130 can also attach. A pole pocket/insertion points 150 also referred to as awning pole pockets is coupled at points on the bottom edge of the trailer structure to insert the opposite end of the main structure support pole 120 using a section of PVC rail 140. The guyline 130 components can be made using cordage materials including ⅛" polyester cordage, and is used to secure the trailer visor 100 to the trailer using a PVC attachment system, or to the ground using a ground stake, in order to provide stability to the visor structure in the event of windy weather of one embodiment.

Figure 2:
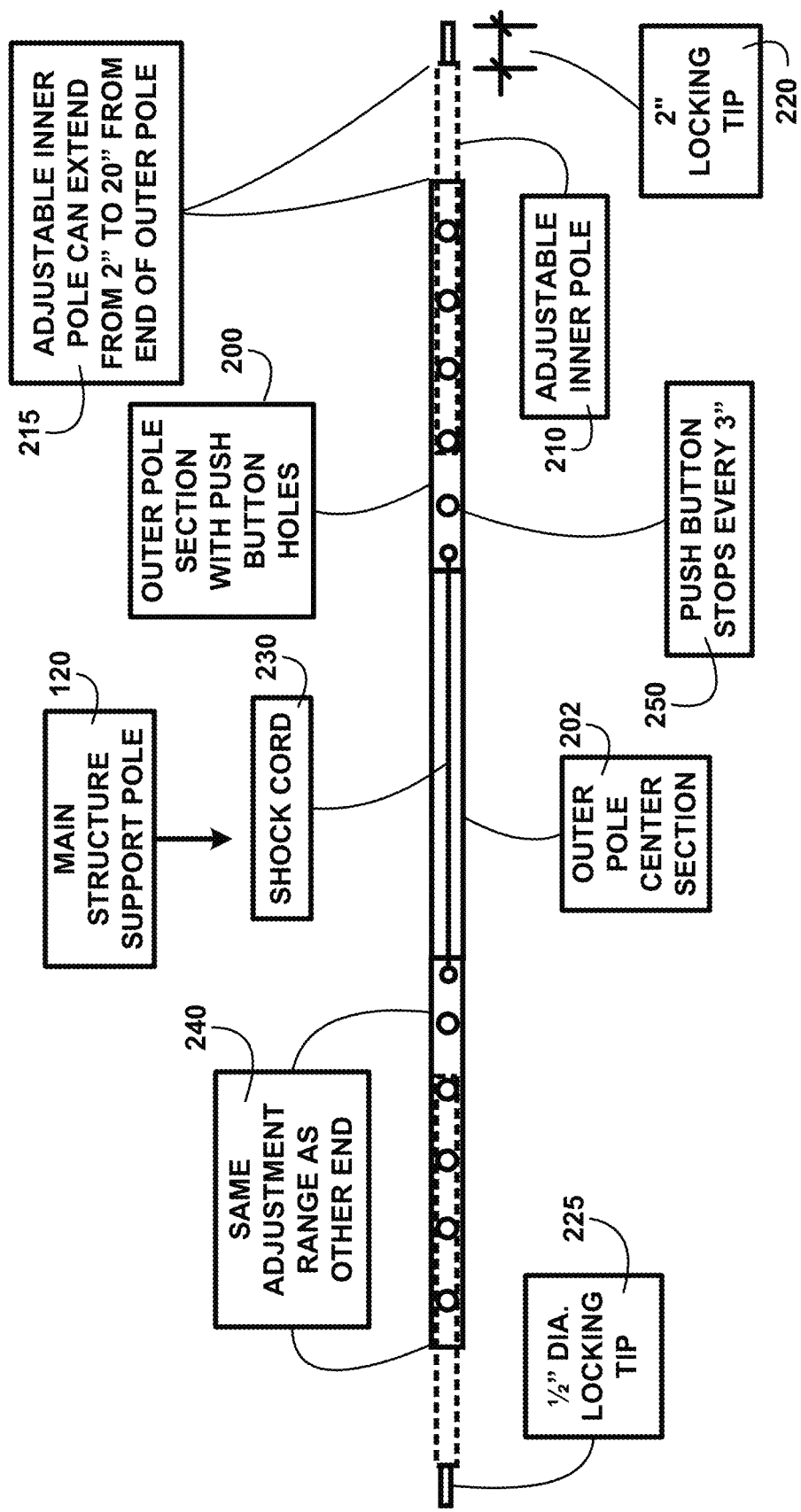
FIG. 2 shows for illustrative purposes only an example of a main structure support pole of one embodiment.

Detailed Description:

FIG. 2 shows for illustrative purposes only an example of a main structure support pole of one embodiment. FIG. 2 shows the main structure support pole 120 including an outer pole center section 202 with a shock cord 230 threaded through the outer pole center section 202 and coupled to two outer pole sections with push button holes 200. The shock cord 230 can be stretched to allow the two outer pole sections with push button holes 200 to separate from the outer pole center section 202 and fold alongside the outer pole center section 202 for storage when not in use.

Each outer pole sections with push button holes 200 includes an adjustable inner pole 210 with a push button latch for adjusting the length the adjustable inner pole 210 extends from the end of the outer pole sections with push button holes 200. Each an adjustable inner pole 210 can extend from 2" to 20" from end of outer pole 215 and includes a 2" locking tip 220. The 2" locking tip 220 is a ½" dia. locking tip 225 that can be inserted into a grommet or a pole pocket/insertion points 150 of FIG. 1. Each adjustable inner pole 210 has the same adjustment range as other end 240 using push button stops every 3" 250 of one embodiment.

Figure 3A:
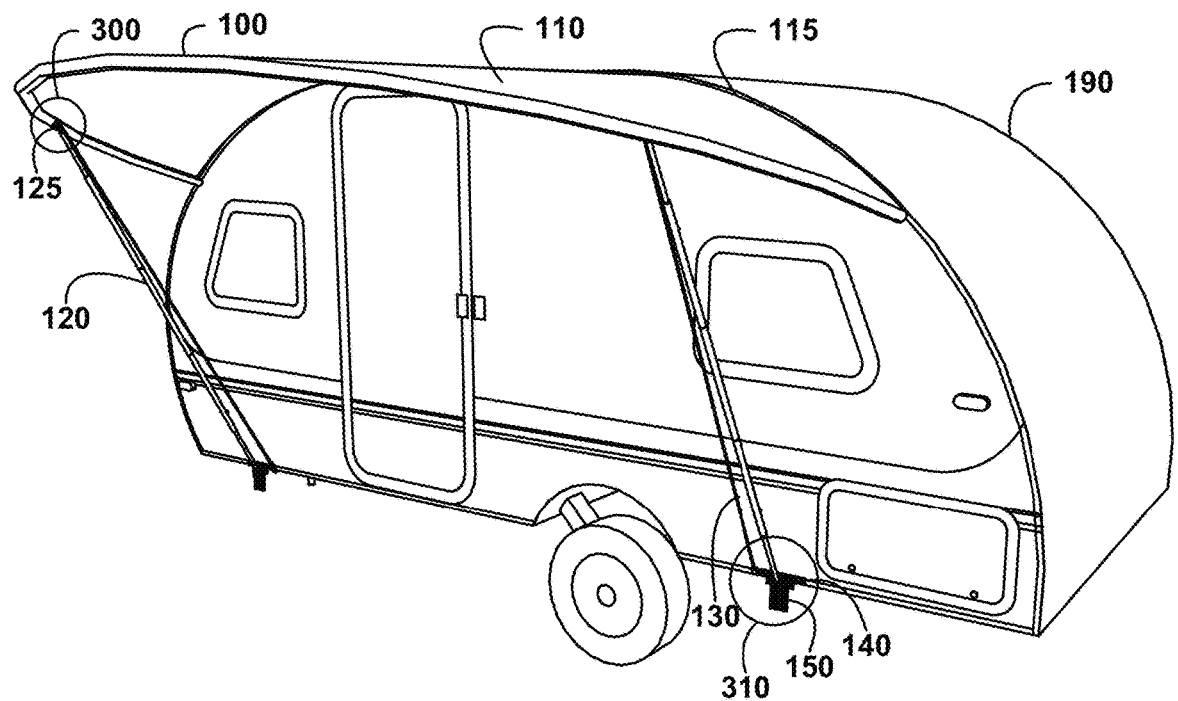
FIG. 3A shows for illustrative purposes only an example of visor support couplings of one embodiment.

Visor Support Couplings:

FIG. 3A shows for illustrative purposes only an example of visor support couplings of one embodiment. FIG. 3A shows the trailer visor 100 installed on the camping trailer 190 including the main body with an outer pole sleeve 110, PVC cord 115, main structure support pole 120, webbing strap 125, guyline 130, PVC rail 140, and pole pocket/insertion points 150. FIG. 3A also shows detail sections for a webbing strap detail 300 and a pole pocket detail 310 of one embodiment.

Figure 3B:
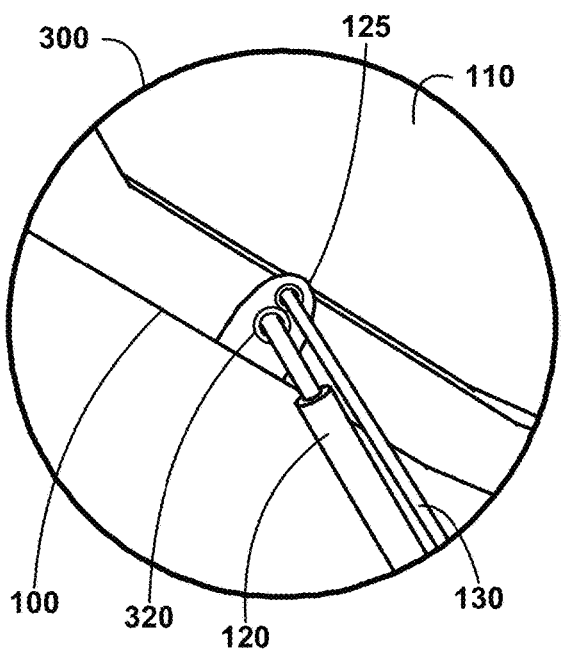
FIG. 3B shows for illustrative purposes only an example of a webbing strap of one embodiment.

A Webbing Strap:

FIG. 3B shows for illustrative purposes only an example of a webbing strap of one embodiment. FIG. 3B shows the webbing strap detail 300 that includes a section of the trailer visor 100 main body, the main body with an outer pole sleeve 110, the main structure support pole 120, and the guyline 130. The webbing strap 125 with a guyline tensioner not shown is shown sewn to the outer pole sleeve 110 and has at least two grommet 320 elements for inserting the 2" locking tip 220 of FIG. 2 and coupling the guyline to the webbing strap 125 of one embodiment.

Figure 3C:
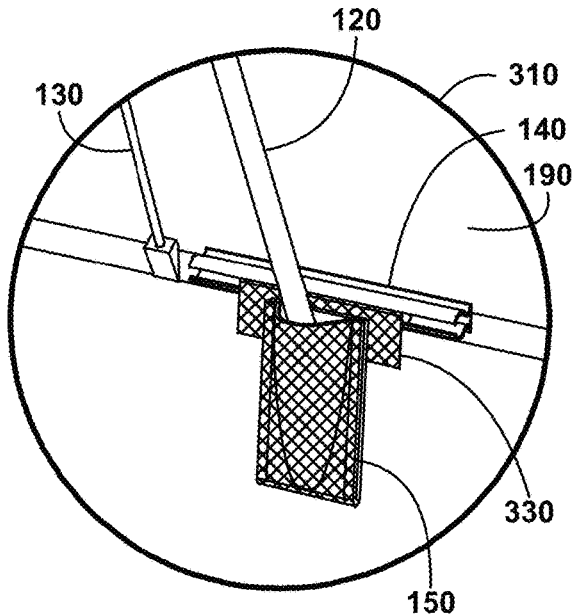
FIG. 3C shows for illustrative purposes only an example of a pole pocket assembly of one embodiment.

A Pole Pocket Assembly:

FIG. 3C shows for illustrative purposes only an example of a pole pocket assembly of one embodiment. FIG. 3C shows the pole pocket detail 310 including the main structure support pole 120, guyline 130, and a section of the PVC rail 140 coupled to the camping trailer 190 and the pole pocket/insertion points 150. The 2" locking tip 220 of FIG. 2 can be inserted into the pole pocket/insertion points 150 of one embodiment.

Figure 4:
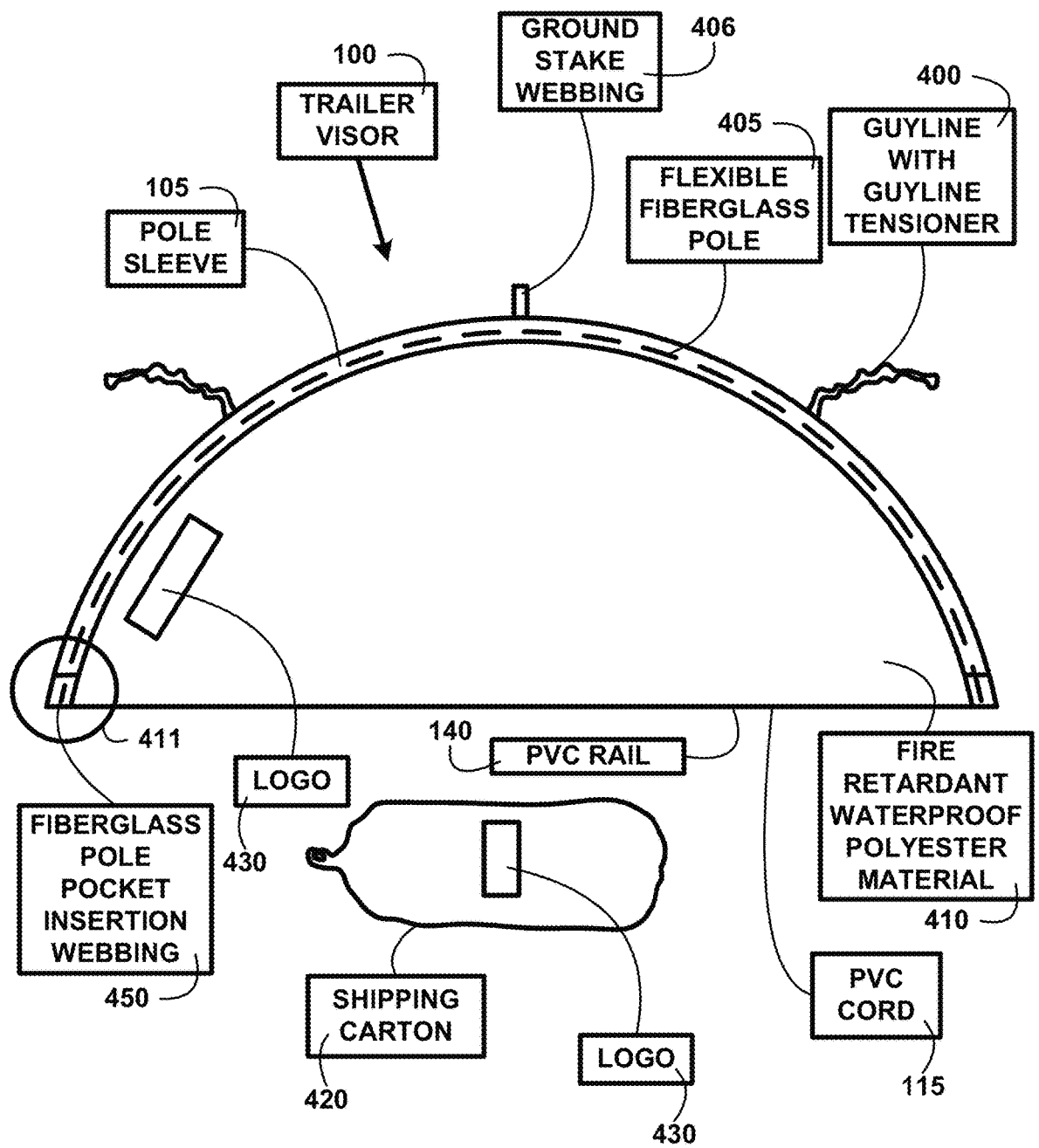
FIG. 4 shows for illustrative purposes only an example of trailer visor components of one embodiment.

Trailer Visor Components:

FIG. 4 shows for illustrative purposes only an example of trailer visor components of one embodiment. FIG. 4 shows trailer visor 100 components including the main body fire retardant waterproof polyester material 410 also used for the pole sleeve 105. The trailer visor 100 components also include a flexible fiberglass pole 405 that is inserted into the pole sleeve 105. A ground stake webbing 406 is used to connect a guyline to a ground stake to provide stability during high wind conditions. All guyline with guyline tensioner 400 components use the guyline tensioners to adjust the guyline to remove slack.

A fiberglass pole pocket insertion webbing 450 is sewn into the main body fire retardant waterproof polyester material 410 at the terminating points of the pole sleeve 105 for providing an easy and convenient method of inserting the flexible fiberglass pole 405 through the pole sleeve 105. The PVC rail 140 is attached to the camping trailer top edge and the PVC cord 115 pulled and enclosed in a sewn sleeve edge and inserted through the PVC rail 140 to make the removable installation of the trailer visor 100 to the camping trailer 190 of FIG. 1. FIG. 4 shows a detail section 411 of the fiberglass pole pocket insertion webbing 450 that is further described in FIGS. 5A, 5B, and 5C.

A shipping carton 420 and the main body fire retardant waterproof polyester material 410 include a logo 430 coupled to the material. The shipping carton 420 is made of the same material as the main body fire retardant waterproof polyester material 410 and allows placement of the trailer visor 100 components within the shipping carton 420 for compact easy access storage of the trailer visor 100 of one embodiment.

Figure 5A:
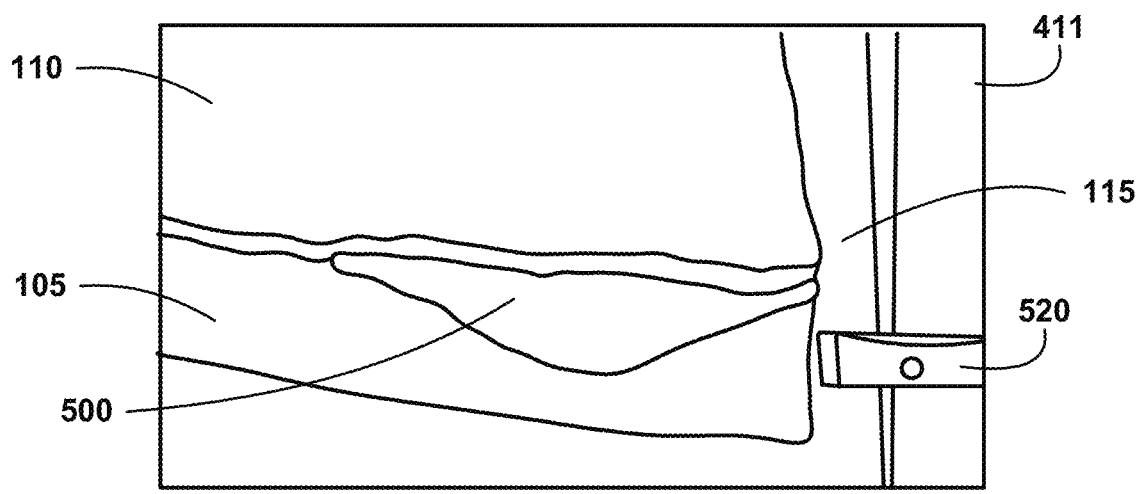
FIG. 5A shows for illustrative purposes only an example of a fiberglass pole pocket sleeve insertion opening of one embodiment.

A Fiberglass Pole Pocket Sleeve Insertion Opening:

FIG. 5A shows for illustrative purposes only an example of a fiberglass pole pocket sleeve insertion opening of one embodiment. FIG. 5A shows the main body with an outer pole sleeve 110, pole sleeve 105, and PVC cord 115 installed and a fiberglass pole insertion opening 500 held in place with a clamp 520 for demonstration purposes only. The detail section 411 of the fiberglass pole pocket insertion webbing 450 of FIG. 4 shows the fiberglass pole insertion opening 500 formed with the fiberglass pole pocket insertion webbing 450 of FIG. 4 of one embodiment.

Figure 5B:
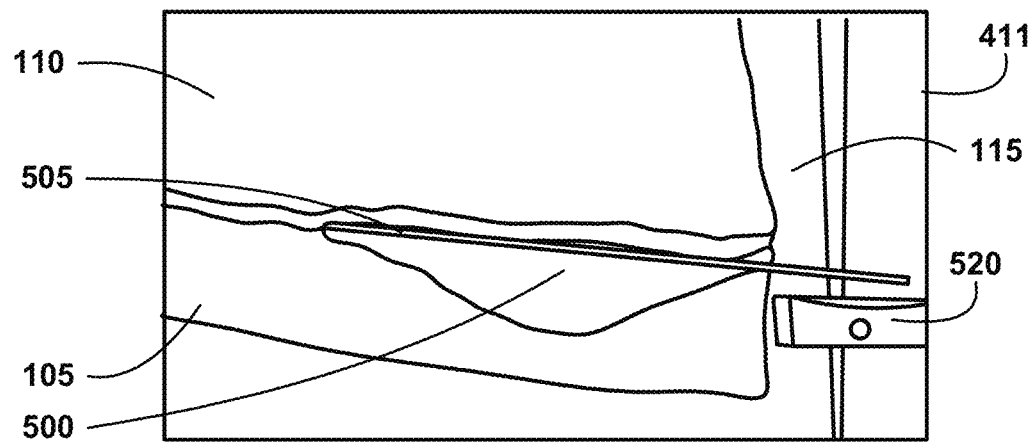
FIG. 5B shows for illustrative purposes only an example of inserting a fiberglass pole of one embodiment.

Inserting a Fiberglass Pole:

FIG. 5B shows for illustrative purposes only an example of inserting a fiberglass pole of one embodiment. FIG. 5B shows the detail section 411 of the fiberglass pole pocket insertion webbing 450 of FIG. 4 shows the fiberglass pole insertion opening 500. FIG. 5B also shows the main body with an outer pole sleeve 110, pole sleeve 105, and PVC cord 115. The fiberglass pole insertion opening 500 is held in place with a clamp 520 for demonstration purposes only.

The flexible fiberglass pole 405 of FIG. 4 can be installed using the fiberglass pole insertion opening 500. FIG. 5B shows a fiberglass pole being inserted with thumb pressure 505 with ease. The fiberglass pole insertion opening 500 is a two-layer Velcro pocket that can be opened along the pocket side, rather than at the top, and into which the pole is simply inserted, and the end laid into the pocket which then captures it using hook and loop along the edge of the opening. This makes set up very simple and easy, and allows the pole to be the exact required length to provide a more taut and proper fabric fit of one embodiment.

Figure 5C:
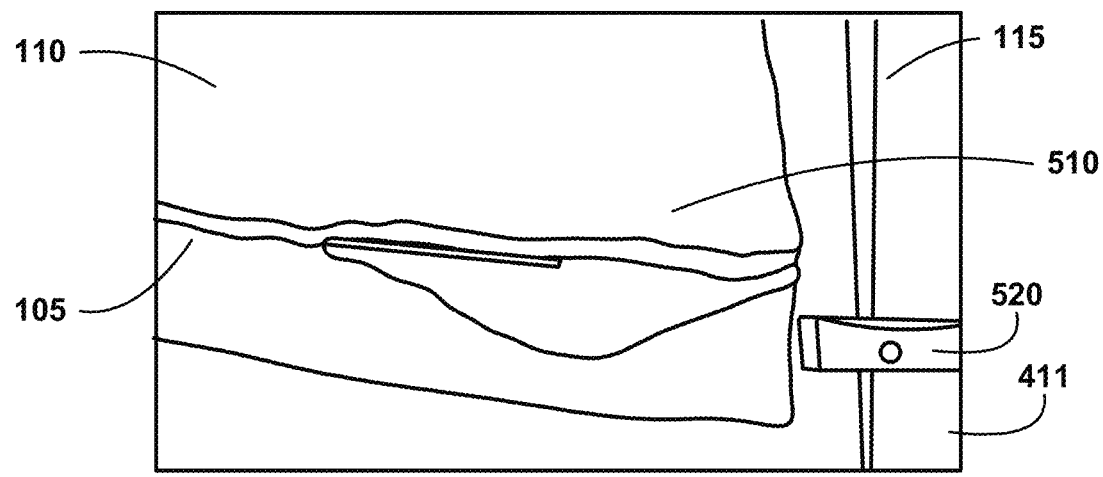
FIG. 5C shows for illustrative purposes only an example of a closed pole pocket sleeve insertion opening of one embodiment.

A Closed Pole Pocket Sleeve Insertion Opening:

FIG. 5C shows for illustrative purposes only an example of a closed pole pocket sleeve insertion opening of one embodiment. FIG. 5C shows the detail section 411 of the fiberglass pole pocket insertion webbing 450 of FIG. 4 shows the fiberglass pole insertion opening 500. main body with an outer pole sleeve 110, pole sleeve 105, and PVC cord 115. FIG. 5C shows a closed fiberglass pole insertion opening 510 held in place with a clamp 520 for demonstration purposes only. The closed fiberglass pole insertion opening 510 uses the hook and loop along the side edge of the opening to secure the fiberglass pole insertion opening 500 of FIG. 5A of one embodiment.

Figure 6:
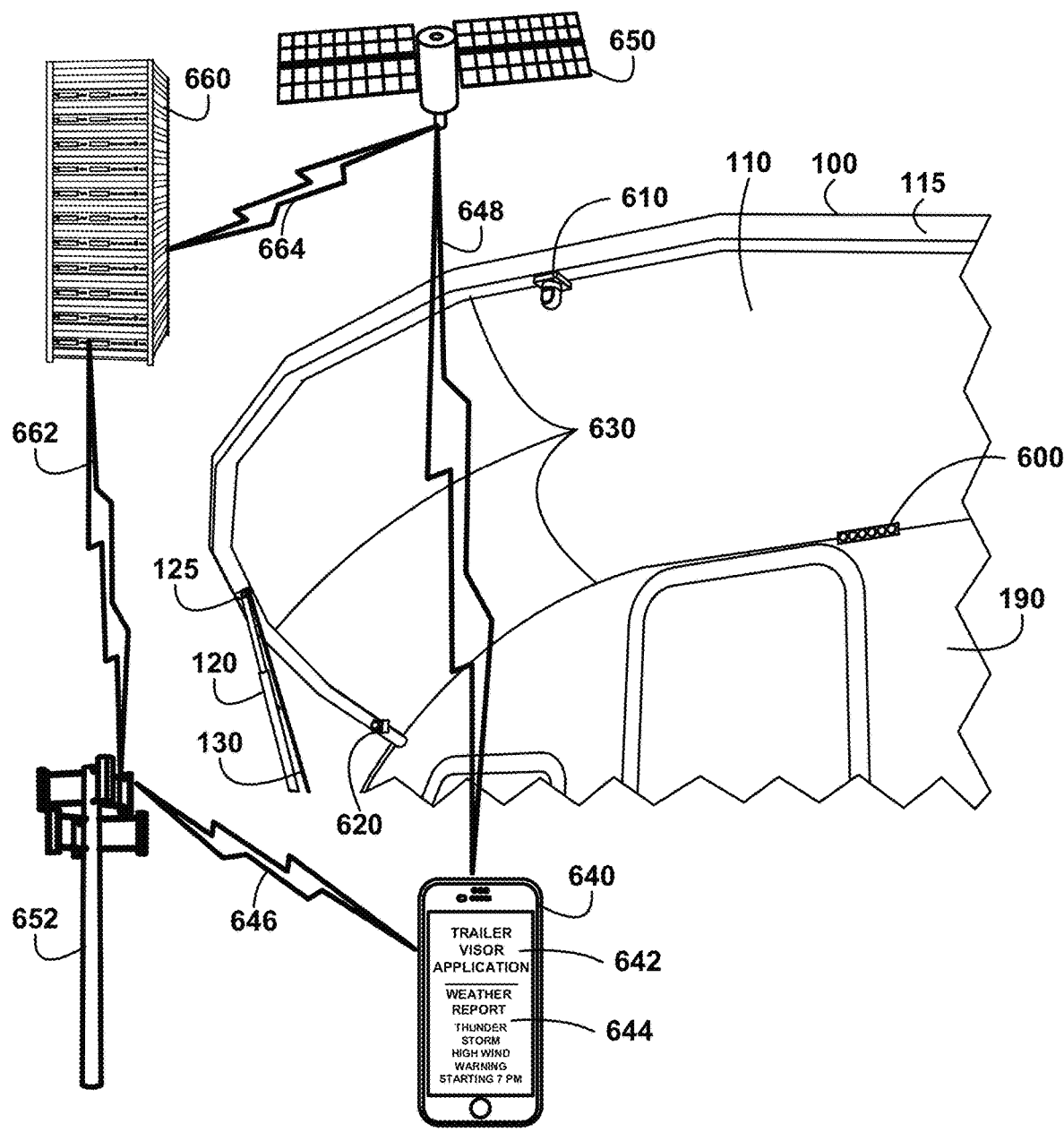
FIG. 6 shows for illustrative purposes only an example of trailer visor electronics and digital device application of one embodiment.

Trailer Visor Electronics and Digital Device Application:

FIG. 6 shows for illustrative purposes only an example of trailer visor electronics and digital device application of one embodiment. FIG. 6 shows the trailer visor 100 installed on the camping trailer 190 including the main body with an outer pole sleeve 110, PVC cord 115, main structure support pole 120, webbing strap 125, and guyline 130. The trailer visor 100 also can include electronic components including a light detection sensor 610, at least one mini camera 620 and at least one LED light bar 600. Each of the electronic components include rechargeable batteries that can be recharged using recharging circuits 630 (not shown) that are pulled through the pole sleeve and PVC cord sleeve and connected to an exterior outlet (not shown) from the camping trailer 190 electrical system of one embodiment.

The electronic components also include a digital trailer visor application 642 that can be installed on a user digital device 640 including a smart phone, laptop computer and tablet. The digital trailer visor application 642 can be used to observe the conditions outside of the camping trailer 190 from inside using images displayed on the user digital device 640 from the at least one mini camera 620. The at least one mini camera 620 can include infrared capability to allow a user to see conditions outside the camping trailer 190 at night without outdoor lighting.

The light detection sensor 610 can detect when light is reduced due to nighttime hours and even in heavy overcast dark cloud cover. The light detection sensor 610 can be set by the user to automatically turn on the at least one LED light bar 600 to illuminate the outside area beneath the trailer visor 100 and beyond for a distance. The light detection sensor 610 can automatically turn off the at least one LED light bar 600 upon sensing sufficient exterior light. Each of the light detection sensor 610, at least one mini camera 620 and at least one LED light bar 600 can be Bluetooth, RFID, GPS, and Wi-Fi enabled to be controlled via mobile devices and applications.

The digital trailer visor application 642 can include connectivity to the electronic components and satellite, cellular service, Bluetooth, RFID, GPS, and Wi-Fi_33 communications. At least one wireless connection can be made to a trailer visor digital server 660. The trailer visor digital server 660 can include server-satellite connectivity 664 to a satellite 650 to provide communication capability to a user digital device 640 with the digital trailer visor application 642 installed. This can provide a user with digital device-satellite connectivity 648 communications even in remote areas. The trailer visor digital server 660 can include server-cellular connectivity 662 to provide a user with digital device-cellular connectivity 646 communications within areas with reception from a cell tower 652.

For example the digital trailer visor application 642 can include settings to automatically check periodic weather conditions and alert a user of conditions that may allow the user in advance for proper preparedness to adjust for the varying conditions for example a weather report thunder storm high wind warning starting 7 pm 644 is displayed on the user digital device 640 and alerts with an audible sound of the forecast weather conditions of one embodiment.

Figure 7A:
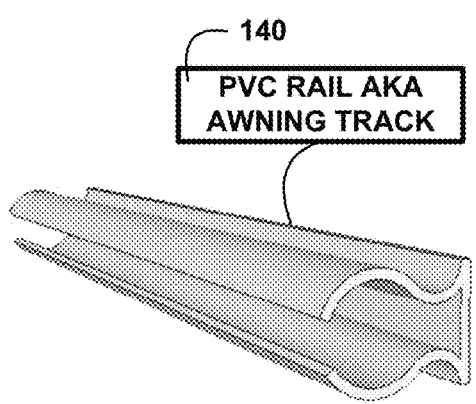
FIG. 7A shows for illustrative purposes only an example of a PVC rail of one embodiment.

A PVC Rail:

FIG. 7A shows for illustrative purposes only an example of a PVC rail of one embodiment. FIG. 7A shows the PVC rail 140 aka awning track. The circular opening of the PVC rail 140 is where the PVC cord 115 is pulled through of one embodiment.

Figure 7B:
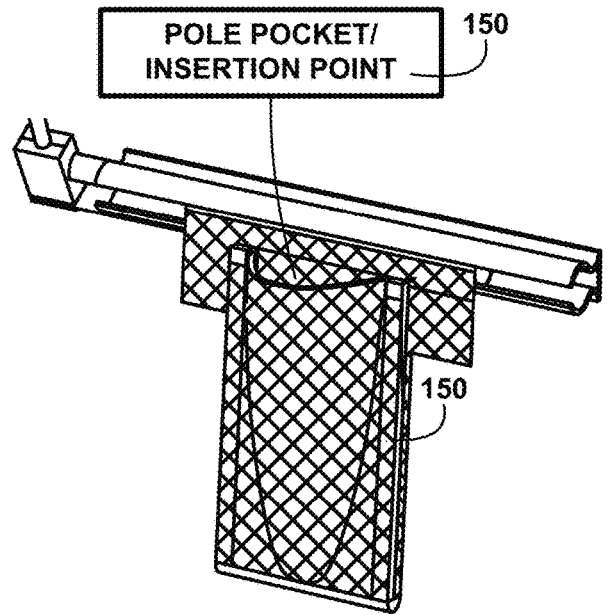
FIG. 7B shows for illustrative purposes only an example of a pole pocket of one embodiment.

A Pole Pocket:

FIG. 7B shows for illustrative purposes only an example of a pole pocket of one embodiment. FIG. 7B shows the pole pocket/insertion points 150 that is webbing folded and cut to create a pole pocket insertion point. A showing is a webbing that is folded around a section of the PVC cord 115 and extended for a length to connect to the by sewing of one embodiment.

Figure 7C:
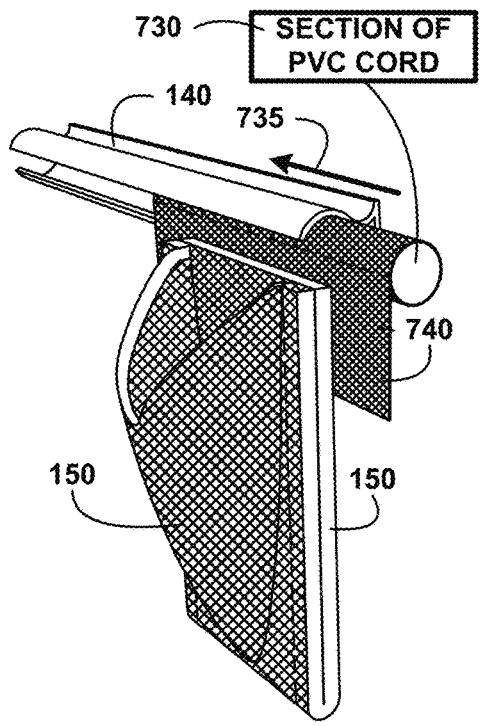
FIG. 7C shows for illustrative purposes only an example of inserting a pole pocket into a PVC rail of one embodiment.

Inserting a Pole Pocket into a PVC Rail:

FIG. 7C shows for illustrative purposes only an example of inserting a pole pocket into a PVC rail of one embodiment. FIG. 7C shows the PVC rail 140, a section of PVC cord 730; the pole pocket/insertion points 150 and PVC cord webbing 740. The section of PVC cord 730 with the PVC cord webbing 740 is shown sliding into a PVC rail section 735 of one embodiment.

Figure 7D:
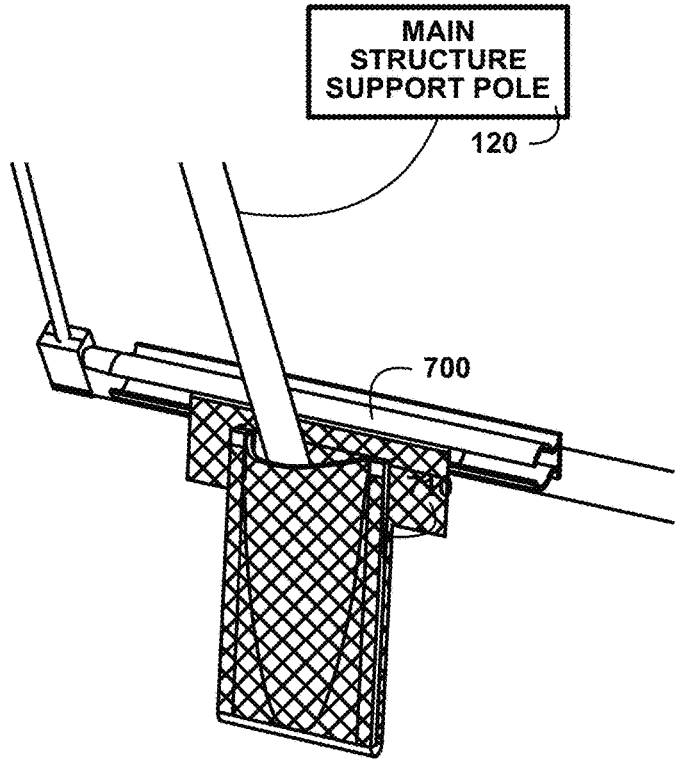
FIG. 7D shows for illustrative purposes only an example of a pole pocket assembly front view of one embodiment.

A Pole Pocket Assembly Front View:

FIG. 7D shows for illustrative purposes only an example of a pole pocket assembly front view of one embodiment. FIG. 7D shows a front view of pole pocket/insertion points 710 with a section of a main structure support pole 120 inserted into the pole pocket/insertion points assembly 700 of one embodiment.

Figure 7E:
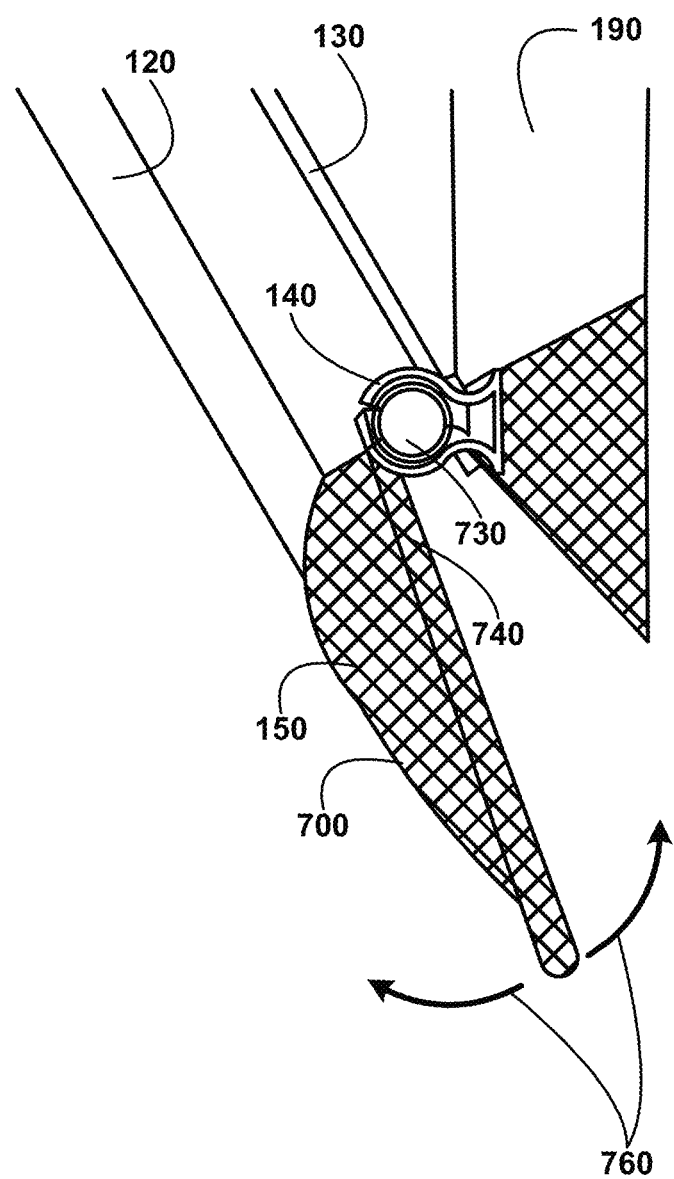
FIG. 7E shows for illustrative purposes only an example of pole pocket assembly flexible alignment of one embodiment.

Pole Pocket Assembly Flexible Alignment:

FIG. 7E shows for illustrative purposes only an example of pole pocket assembly flexible alignment of one embodiment. FIG. 7E shows a lower edge area of the camping trailer 190 to which a section of the PVC rail 140 is connected. Also shown is the guyline 130 and main structure support pole 120 inserted into the pole pocket/insertion points assembly 700. The pole pocket/insertion points assembly 700 includes the section of PVC cord 730 with the PVC cord webbing 740 and pole pocket/insertion points 150. The PVC cord webbing 740 extending from the section of the PVC rail 140 is flexible and provides a flexible swing to adjust to a main structure support pole angle 760 of one embodiment.

Figure 8:
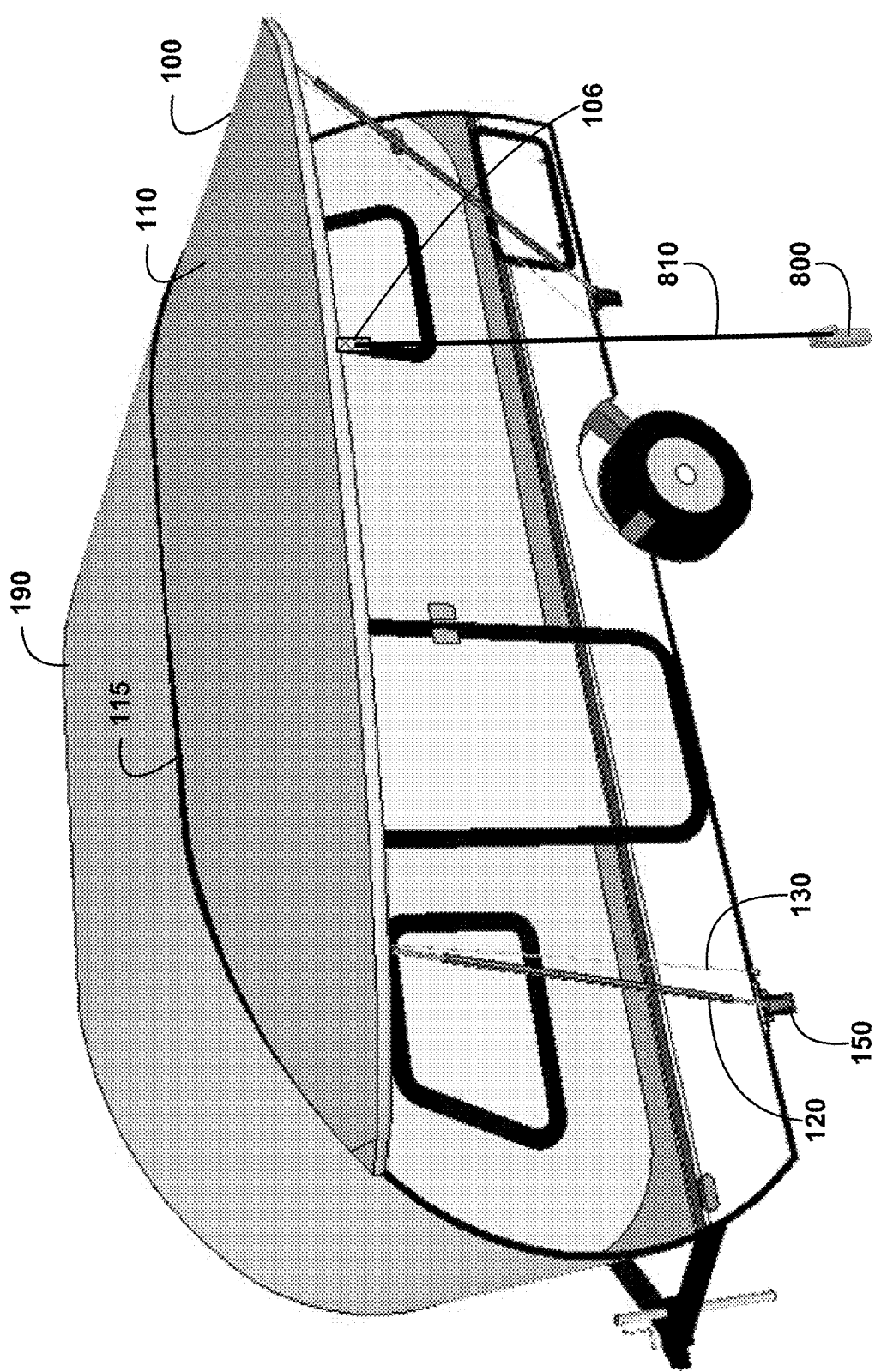
FIG. 8 shows for illustrative purposes only an example of guyline ground stake stability of one embodiment.

Guyline Ground Stake Stability:

FIG. 8 shows for illustrative purposes only an example of guyline ground stake stability of one embodiment. FIG. 8 shows the camping trailer 190 with the trailer visor 100 installed including the main body with an outer pole sleeve 110, PVC cord 115, main structure support pole 120, and guyline 130, and pole pocket/insertion points 150. Also shown is the webbing strap 106 positioned along the center of the outer edge of the main body with an outer pole sleeve 110. A user can drive a ground stake 800 into the ground approximately beneath the webbing strap 106 position. A ground guyline 810 can be attached to the webbing strap 106 and the ground stake 800 and the length adjusted using a guyline tensioner. The ground guyline 810 installed in this manner can provide additional stability to the trailer visor 100 in high wind conditions of one embodiment.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A method, comprising:
securing a trailer visor to a camping trailer forming a water proof and fire retardant awning for providing cover from sun and rain in proximity of a camping trailer door;
connecting the trailer visor to the camping trailer using a trailer visor main body material coupled PVC cord and camping trailer structure coupled PVC rail;
supporting the trailer visor using a fiberglass pole coupled to the trailer visor and at least one main structure support pole coupled to the camping trailer structure using at least one pole pocket/insertion points and the trailer visor;
stabilizing the trailer visor using at least one guyline coupled to the camping trailer structure and the trailer visor main body; and
integrating at least one electronic component onto the trailer visor for providing exterior lighting and exterior camera viewing using a digital trailer visor application installed on a user digital device for controlling the at least one electronic component.

2. The method of claim 1, further comprising forming a water proof and fire retardant awning is configured to include using a polyester material with a water proof coating and a fire-retardant coating which meets cpai-84 fire retardancy standards.

3. The method of claim 1, further comprising using at least one guyline is configured to include a ⅛" polyester cordage.

4. The method of claim 1, further comprising using a trailer visor main body coupled PVC cord is configure to include an 8.5 mm PVC cord pulled and enclosed in a sewn sleeve edge and inserted through the camping trailer structure coupled PVC rail.

5. The method of claim 1, further comprising supporting the trailer visor using at least one main structure support pole configured to include an outer pole center and two outer pole sections with push button holes connected with a stretchable shock cord configured to fold alongside each other by stretching the shock cord, two adjustable inner poles with a push button latch configured to extend in a range of 2 inches to 20 inches from the end of the outer pole sections for adjusting the extension length and two locking tips.

6. The method of claim 1, further comprising using at least one pole pocket/insertion points configured to include a webbing folded and sewn on three sides and cut to create a pole pocket insertion point.

7. The method of claim 1, further comprising stabilizing the trailer visor using at least one guyline configured to include ⅛" polyester cordage.

8. The method of claim 1, further comprising integrating at least one electronic component to the trailer visor is configured to include a light detection sensor, at least one LED light bar configured for sensing exterior light levels and automatically turning on and off the at least one LED light bar according to the exterior light levels and configured to include at least one mini camera configured to capture exterior visual images and displaying the exterior visual images on the user digital device using the digital trailer visor application.

9. The method of claim 1, further comprising using a digital trailer visor application installed on a user digital device configured to include connectivity to the electronic components and satellite, cellular service, a trailer visor digital server, Bluetooth, RFID, GPS, and Wi-Fi communications, wherein the digital trailer visor application is configured for controlling the at least one electronic component.

10. The method of claim 1, further comprising integrating at least one electronic component to the trailer visor is configured to include a trailer visor digital server configured for providing digital device-satellite connectivity and digital device-cellular connectivity to the user digital device using the digital trailer visor application with cellular and satellite communications connectivity.

11. An apparatus, comprising:
a trailer visor configured to couple to a camping trailer forming a water proof and fire retardant awning for providing cover from sun and rain in proximity of a camping trailer door;
a PVC rail coupled to a camping trailer structure configured for attaching the trailer visor to the camping trailer using a PVC cord;
a fiberglass pole coupled to the trailer visor configured for maintaining tautness;
at least one pole pocket/insertion points configured to couple to a camping trailer structure for inserting at least one main structure support pole for supporting the trailer visor;
at least one guyline coupled to the camping trailer structure and the trailer visor main body to stabilize the trailer visor using; and
at least one electronic component coupled to the trailer visor configured to provide exterior lighting and exterior camera viewing using a digital trailer visor application installed on a user digital device.

12. The apparatus of claim 11, further comprising the at least one main structure support pole configured to include an outer pole center and two outer pole sections with push button holes connected with a stretchable shock cord configured to fold alongside each other by stretching the shock cord, two adjustable inner poles with a push button latch configured to extend in a range of 2 inches to 20 inches from the end of the outer pole sections for adjusting the extension length and two locking tips.

13. The apparatus of claim 11, further comprising the at least one pole pocket/insertion points configured to include a webbing folded and sewn on three sides and cut to create a pole pocket insertion point.

14. The apparatus of claim 11, further comprising a water proof and fire retardant awning configured to include a polyester material with a water proof coating and a fire-retardant coating which meets cpai-84 fire retardancy standards.

15. The apparatus of claim 11, further comprising the at least one electronic component configured to include a light detection sensor, at least one LED light bar configured for sensing exterior light levels and automatically turning on and off the at least one LED light bar according to the exterior light levels and configured to include at least one mini camera configured to capture exterior visual images and displaying the exterior visual images on the user digital device using the digital trailer visor application.

16. An apparatus, comprising:
a water proof and fire retardant material configured to form a trailer visor camping trailer awning;
a fiberglass pole coupled to the trailer visor configured for maintaining tautness of the trailer visor camping trailer awning;
a camping trailer structure coupling device including a PVC rail attached to the camping trailer structure and a PVC cord enclosed in the water proof and fire retardant material for insertion into the PVC rail;
at least one main structure support pole coupled to the camping trailer structure using at least one pole pocket/insertion points and trailer visor camping trailer awning using a webbing strap with grommets;
a trailer visor camping trailer awning stabilizing device configured to include at least one guyline and guyline tensioner and coupled to the camping trailer structure and trailer visor camping trailer awning; and
a digital trailer visor application configured to be installed on a user digital device and configured to control at least one electronic component coupled to the trailer visor camping trailer awning.

17. The apparatus of claim 16, further comprising the at least one main structure support pole is configured to include interlocking outer pole sections and telescoping inner pole sections with push button latches and configured to extend the length of the at least one main structure support pole on both ends in a range of 2 inches to 20 inches.

18. The apparatus of claim 16, further comprising the water proof and fire retardant material is configured to include a polyester material with a water proof coating and a fire-retardant coating which meets cpai-84 fire retardancy standards.

19. The apparatus of claim 16, further comprising the trailer visor camping trailer awning is configured to couple a trailer visor camping trailer awning on both sides of the camping trailer simultaneously.

20. The apparatus of claim 16, further comprising the digital trailer visor application configured to include displaying weather report warnings and audible alerts to a user using the user digital device.

* * * * *